United States Patent [19]

Yamada et al.

[11] Patent Number: 4,733,088
[45] Date of Patent: Mar. 22, 1988

[54] RADIATION DETECTOR

[75] Inventors: Hiromichi Yamada, Hino; Yasuo Tsukuda, Ome; Atsushi Suzuki, Higashiyamato; Hajime Yamamoto, Tokyo; Minoru Yoshida, Tokyo; Kenji Maio, Tokyo; Hideji Fujii, Tokyo, all of Japan

[73] Assignees: Hitachi, Ltd.; Hitachi Medical Corp.; Hitachi Metals, Ltd., all of Tokyo, Japan

[21] Appl. No.: 895,455

[22] Filed: Aug. 11, 1986

[30] Foreign Application Priority Data

Sep. 2, 1985 [JP] Japan .................................. 60-191951
Apr. 30, 1986 [JP] Japan .................................. 61-98330
Jul. 11, 1986 [JP] Japan .................................. 61-161847

[51] Int. Cl.$^4$ ..................... C09K 11/475; G01T 1/202
[52] U.S. Cl. .......................... 250/483.1; 252/301.4 S; 252/301.4 H; 252/301.4 P; 252/301.4 F

[58] Field of Search ................. 252/301.4 S, 301.4 P, 252/301.4 H, 301.4 F, 301.4 R; 250/483.1

[56] References Cited

U.S. PATENT DOCUMENTS 4,242,221 12/1980 Cusano et al. ................ 252/301.4 H
4,421,671 12/1983 Cusano et al. ............ 252/301.4 R X
4,442,360  4/1984 Suzuki et al. ............. 252/301.4 S X Primary Examiner—Jack Cooper
Attorney, Agent, or Firm—Antonelli, Terry & Wands

[57] ABSTRACT

A radiation detector comprises a scintillator capable of emitting light by radiation and a photodetector for detecting the light emitted from the scintillator, the scintillator being composed of a sintered body prepared by sintering rare earth oxysulfide as a body starting material containing a densification additive by hot isostactic pressing. The sintered body has a high light output and a high density.

9 Claims, 4 Drawing Figures

RADIATION DETECTOR

BACKGROUND OF THE INVENTION

This invention relates to a radiation detector for X-rays, γ-rays, etc., and particularly to a radiation detector for use in X-ray CT (computed tomography), a position camera, etc.

X-ray CT includes various types and requires an array of 20 to 1,000 X-ray detecting elements.

Heretofore, a gas chamber filled with xenon, a combination of BGO single crystal (bismuth germanate) and a photomultiplier, and a combination of CsI : Tl single crystal or $CdWO_4$ single crystal and a photodiode have been used for the radiation detector for use in X-ray CT, etc. The xenon chamber requries a thick window owing to the sealing of a high pressure xenon gas in the detector, and its X-ray absorbance is as low as about 50% because two collimators must be provided per element. In the case of BGO, the luminescence efficiency is low, e.g. about 1%, and thus must be used together with a photomultiplier. That is, the photomultiplier and its accessory high voltage power source are requries and consequently the number of elements in an array is limited.

The CsI : Tl single crystal has a high efficiency, but is deliquescent and has an after-glow (phenomenon of luminescence after the X-ray has been turned off). Thus, it still has a practical problem.

The $CdWO_4$ crystal has a low luminescence efficiency, and has such problems as easy cleavage at cutting and a toxicity.

The common drawback of the foregoing single crystal scintillator is a fluctuation of luminescence properties in the single crystal. Generally, a single crystal is made to grow from a melting solution, and lattice defects are liable to develop in the crystal during the growth process, and an after-glow will often appear. An activator is often added to the scintillator, but it is difficult to distribute it uniformly in the crystal, and thus the crystal has uneven luminescence. These problems mean that it is very difficult to make the characteristics of the individual detectors uniform.

To solve these problems, some of the present inventors have already proposed a radiation detector using phosphor particles as scintillator [Japanese patent applications Kokai (Laid-open) Nos. 56-151,376 and 57-70,476]. To obtain a sectional image in a radiation detector for X-ray CT, the radiation detector is usually 1 to 3 mm wide and about 20 mm long. Thus, the number of phosphor particles in one radiation detector is, for example, about 300,000, though dependent on their particle sizes. The characteristics of the individual phosphor particles may by slightly different from one another, but a fluctuation of the characteristics as a scintillator can be reduced to 1/square root of number of phosphor particles, that is, about 0.01% by using thoroughly mixed phosphor particles as one scintillator. A satisfactory result can be obtained thereby.

This type of radiation will be described, referring to FIG. 1. After transmission through a cover 5 composed of an aluminum film and a light-scattering layer 4, incoming X-ray 1 makes a scintillator particle layer 2 (phosphor particles solidified by polystyrene) emit light. The emitted light passes through a space 7 and a secondary radiation-preventing layer 8 (Pb glass) and reaches a photodiode 3, where the emitted light is converted to an electric current. To efficiently lead the light emitted from the scintillator particle layer to the photodiode, a vessel 6 is entirely coated with a reflecting film. This type of radiation detector can have about 2-fold output power, as compared with a detector based on a combination of a single crystal scintillator and a photodiode, and is very desirable as a detector for a head scanner, but still has some problem, when applied as a detector for a whole body scanner, because the image processing system for the head scanner is different from that for the whole body scanner.

In FIG. 1, the luminescence of the scintillator layer 2 is uniform, but the emitted light undergoes reflections on the reflecting film surrounding the space 7 many times until the light reaches the photodiode 3. Therefore, if the reflecting film is uneven in the reflectivity, no accurate information of the incoming X-ray can be obtained. When many such detectors are used as elements in an array, there are fluctuations in the characteristis among the individual elements. As a result, the image produced by such an array will have a ring-pattern unevenness or artifact.

To solve these problems, a radiation detector of such a structure as shown in FIG. 2 is preferable. That is, a silicon photodiode 3 is provided at the bottom of a vessel 6 made from brass, and a light-reflecting aluminum layer is formed on the inside surface of the container 6. Pb glass 8 is laid on the silicon photodiode 3 in the vessel 6, and a scintillator layer 2 is formed thereon. The Pb glass is provided to cut the fluorescent X-ray emitted from the scintillator.

In the case of a scintillator particle layer in the structure as shown in FIG. 2, the particle layer itself is optically opaque, and it is difficult to efficiently lead the emitted light to the silicon photodiode. Thus, even if a highly efficient $Gd_2O_2S$: Pr, Ce, F scintillator is used, a signal output of a level only substantially equal to that of a detector based on a combination of single crystal scintillator $CdWO_4$ and silicon photodiode can be obtained. This is another problem. To increase the output level, a transparent signal crystal scintillator of rare earth oxysulfide should be used, but only single crystal having a size of a few square millimeter can be obtained according to the process disclosed in J. Appl. Phys. 42, 3049 (1971).

SUMMARY OF THE INVENTION

An object of the present invention is to provide a radiation detector having a scintillator of high light output level.

This and other objects of the present invention can be attained by a radiation detector, which comprises a scintillator capable of emitting light by radiation and a photodetector for detecting the light emitted from the scintillator, the scintillator being composed of a sintered body prepared by sintering rare earth oxysulfide as a starting material containing a densification additive by hot isostactic pressing.

DETAILED DESCRIPTION OF PREFERRED EMBODIMENTS

Figure 1:
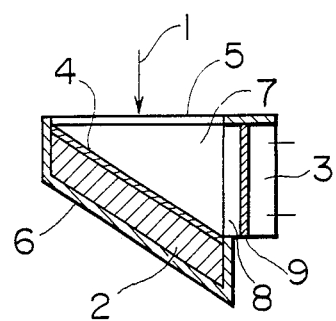
FIGS. 1 and 2 are cross-sectional view of radiation detectors for explaining the present invention.

The rare earth oxysulfide for use in the present invention includes phosphors known from the Japanese patent application Kokai (Laid-open) No. 56-151,376, etc. for example, phosphors represented by the general formula:

$(Ln_{1-x-y}M_xCe_y)_2O_2S:(X)$ wherein Ln is at least one element selected from the group consisting of Gd, La and Y; M is at least one element selected from the group consisting of Eu, Pr and Tb; X is at least one element selected from the group consisting of F and Cl; x is a value in a range of $3\times10^{-6} \leq x \leq 0.2$; y is a value in a range of $10^{-6} \leq Y \leq 5\times10^{-3}$; and X is in an amount ranging from 5 to 1,000 ppm by weight.

The reasons why the values of x and y in said ranges and the amount of F and Cl in said range are preferable are disclosed in said Japanese patent application Kokai (Laid-open) No. 56-151,376. The preferable element represented by M is Pr, and the preferable element represented by X is F. More preferable amount of F is in a range of 2 to 300 ppm by weight. Other phosphors than those mentioned above can be used.

It is preferable to add, as the densification additive, 0.001 to 10% by weight of at least one member selected from the group consisting of $Li_2GeF_6$, $(NH_4)_2GeF_6$, $Na_2GeF_6$, $K_2GeF_6$, $NaPF_6$, $KPF_6$, $NH_4PF_6$, $Na_3AlF_6$, $K_2SiF_6$, $Li_2SiF_6.2H_2O$, $Na_2SiF_6$, LiF, $NaHF_2$, $KHF_2$, $NH_4HF_2$, $Na_2TiF_6$, $K_2TiF_6$, $K_2ZrF_6$, $(NH_4)_2ZrF_6$, $MgSiF_6$, $SrSiF_6$, $Li_2B_4O_7$, $LiBF_4$, $NaBF_4$ and $KBF_4$, on the basis of the rare earth oxysulfide.

Even the addition of 0.001% by weight of the densification additive on the basis of the rare earth oxysulfide is effective. Too much addition does not increase the light output of the scintillator material and is also economically disadvantageous. Thus, addition of not more than 10% by weight of the densification additive is preferable, but the present invention is practicable in excess of 10% by weight.

It is preferable to produce a sintered body through hot isostatic pressing by filling powdered scintillator and a densification additive in a metal container, vacuum sealing the container and subjecting the container to hot isostatic pressing at 800° to 1,700° C. under a pressure of 500 to 2,000 atmospheres. When the pressure is lower under these conditions, the hot isostatic pressing must be carried out at a higher temperature. More preferable hot isostatic pressing conditions are such that the amount of the densification additive to be added is 0.01 to 4% by weight, the temperature is 1,100° to 1,500° C., and the pressure is 800 to 1,800 atmospheres. Materials for the metal vessel for the hot isostatic pressing are preferably metals easily deformable (being easily softened) at an elevated temperature, for example, pure iron, stainless steel, nickel, platinum, etc.

It is preferable to anneal the sample taken out of the metal container after the hot isostatic pressing in an inert gas. The annealing temperature is preferably 500° to 1,500° C., more preferably 900° to 1,300° C. Increase in the light output by annealing somewhat depends on the species of the densification additive, and may be 30–50% increased when annealed in an Ar gas at 1,200° C. for 30 minutes, as compared with the light output before the annealing. Since the half width in the peak of X-ray difffaction pattern of a sample subjected to hot isostatic pressing and successive annealing is smaller than that of a sample subjected only to the hot isostatic annealing, it seems that the increase in light output by annealing is due to promotion of crystallization.

Since the hot isostatic pressing is carried out after the addition of the densification additive in the present invention, the resulting sintered body has a much higher density than that of the sintered body obtained without any addition of the densification additive, and a scintilator material of high density, i.e. packing density (ratio of an experimental density to the theoretical value) of 96% or higher can be obtained.

Figure 3A:
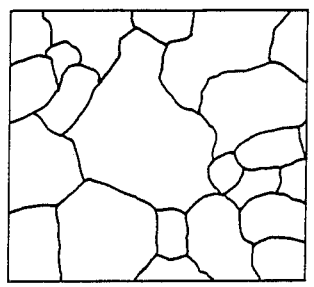
FIGS. 3a and 3b show schematic structures of the present scintillator material and comparative material, respectively.
Figure 3B:
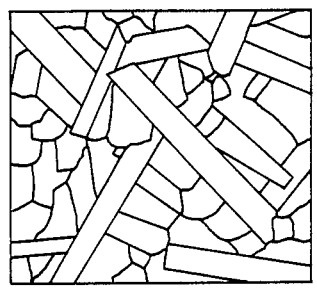

Furthermore, the shapes of crystal grains observed in a cross-section of the sintered body according to the present invention differs from those obtained without the addition of the densification additive. That is, the sintered body obtained according to the present invention characteristically contains much more crystal grains having a columnar appearance. The presence of columnar particles can be observed in the cross-section of the sintered body by a microscope. It has been found that the distinguished characteristics as desired in the present invention can be obtained, if the columnar particles are contained in an area ratio of 10% or more in the cross-section by observation of a microscopic picture. FIG. 3a shows the shapes of crystal grains when no densification additive is added, and FIG. 3b shows shapes of crystal grains when the densification additive is added.

EXAMPLE 1

Figure 2:
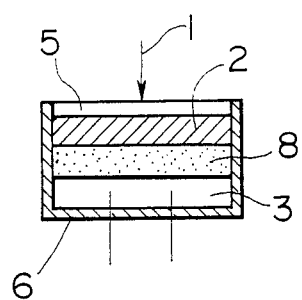

0.087 g of $Li_2GeF_6$ (corresponding to 0.1% by weight on the basis of powdered scintillator) was added to 87 g of powdered scintillator $(Gd_{0.999}Pr_{0.001}Ce_{6\times10^{-6}})_2O_2S:(F)$, and the mixture was filled in a pure iron container, 52 mm in diameter, 37 mm long and 1 mm thick (available capacity: 21.9 cm³). The container was vaccum sealed while degasifying the container with heating. Then, the container was placed in a hot isostatic press and subjected to hot isostatic pressing at 1,300° C. under 1,500 atmospheres for 1.5 hour, and the sintered body was taken out of the container after cooling, and then processed into a sheet, 1 mm thick. The sheet was annealed in an inert gas at 1,200° C for 30 minutes. The thus obtained sintered body sheet was assembled into a detector as shown in FIG. 2, and was subjected to measurement of light output under irradiation of X-ray (tube voltage 120 kV, 100 mA). It was found that the relative light output of the detector using the sintered body sheet was 1.6 on the basis of the light output of a detector using a sintered body sheet containing no densification additive as unity.

EXAMPLE 2

0.00087 g of $Li_2GeF_6$ (corresponding to 0.001% by weight on the basis of powdered scintillator) was added to 87 g of powdered scintillator $(Gd_{0.999}Pr_{0.001}Ce_{6\times10^{-6}})_2O_2S:(F)$, and the mixture was then treated in the same manner as in Example 1. The thus obtained sintered body sheet was assembled into a detector as in FIG. 2 and subjected to measurement of light output under irradiation of X-ray (tube voltage 120 kV, 100 mA). It was found that the relative light output of the detector using the sintered body sheet of this Example was 1.1 on the basis of the light output of a detector likewise prepared without the densification additive as unity.

EXAMPLE 3

8.7 g of $Li_2GeF_6$ (corresponding to 10% by weight on the basis of powdered scintillator) was added to 87 g of powdered scintillator $(Gd_{0.999}Pr_{0.001}Ce_{6\times 10^{-6}})_2O_2S:(F)$, and then the mixture was treated in the same manner as in Example 1. The thus obtained sintered body sheet was assembled into a detector as in FIG. 2 and subjected to measurement of light output under irradiation of X-ray shown in FIG. 2, and was subjected to measurement of light output under irradiation of X-ray (tube voltage 120 kV, 100 mA). It was found that the relative light output of the detector using the sintered body sheet was 1.2 on the basis of the light output of a detector using a sintered body sheet containing no densification additive as unity.

EXAMPLES 4-26

0.087 g each of various densification additives (corresponding to 0.1% by weight on the basis of powdered scintillator) was added to 87 g of powdered scintillator $(Gd_{0.999}Pr_{0.001}Ce_{6\times 10^{-6}})_2O_2S:(F)$, and the mixtures were then treated in the same manner as in Example 1. Each of the thus obtained sintered body sheet was assembled into a detector as in FIG. 2 and subjected to measurement of light output under irradiation of X-ray (tube voltage 120 kV, 100 mA). The relative light outputs of the detectors using the sintered body sheets are shown in Table 1 on the basis of the light outputs of detectors using sintered body sheets containing no densification additives as unity.

TABLE 1

| Example No. | Densification additive | Relative light output |
|---|---|---|
| 4 | $(NH_4)_2GeF_6$ | 1.6 |
| 5 | $Na_2GeF_6$ | 1.5 |
| 6 | $K_2GeF_6$ | 1.5 |
| 7 | $NaPF_6$ | 1.4 |
| 8 | $KPF_6$ | 1.4 |
| 9 | $NH_4PF_6$ | 1.5 |
| 10 | $Na_3AlF_6$ | 1.5 |
| 11 | $K_2SiF_6$ | 1.3 |
| 12 | $Li_2SiF_6 \cdot 2H_2O$ | 1.5 |
| 13 | $Na_2SiF_6$ | 1.3 |
| 14 | LiF | 1.6 |
| 15 | $NaHF_2$ | 1.5 |
| 16 | $KHF_2$ | 1.4 |
| 17 | $NH_4HF_2$ | 1.4 |
| 18 | $Na_2TiF_6$ | 1.3 |
| 19 | $K_2TiF_6$ | 1.4 |
| 20 | $K_2ZrF_6$ | 1.3 |
| 21 | $(NH_4)_2ZrF_6$ | 1.4 |
| 22 | $MgSiF_6$ | 1.4 |
| 23 | $SrSiF_6$ | 1.4 |
| 24 | $LiBF_4$ | 1.5 |
| 25 | $NaBF_4$ | 1.4 |
| 26 | $KBF_4$ | 1.3 |

EXAMPLES 27-35 AND COMPARATIVE EXAMPLE 1

Powdered scitillators of $(Gd_{0.997}Pr_{0.003}Ce_{6\times 10^{-6}})_2O_2S$ containing 90 ppm of F and various densification additives shown in Table 2 were vacuum sealed in stainless steel containers, and then the containers were subjected to hot isostatic pressing in an argon gas at 1,300° C. under 1,000 atmospheres for 3 hours. Packing density, cross-sectional area ratio of columnar microcrystals in any cross-section and relative light output of the thus obtained sintered bodies on the basis of sintered bodies containing no densification additives likewise obtained by hot isostatic pressing are shown in Table 2.

TABLE 2

| Example No. | Densification additive Formula | Amount (wt %) | *Packing density (%) | Cross-sectional area ratio of columnar microcrystal | Relative light output |
|---|---|---|---|---|---|
| 27 | LiF | 0.08 | 99.8 | 43 | 1.2 |
| 28 | $LiB_4O_7$ | 0.10 | 99.8 | 37 | 1.3 |
| 29 | $Na_3AlF_6$ | 0.09 | 99.6 | 25 | 1.2 |
| 30 | $NaPF_6$ | 0.12 | 99.2 | 33 | 1.4 |
| 31 | $Li_2GeF_6$ | 0.10 | 99.8 | 35 | 1.4 |
| 32 | $NaBF_4$ | 0.20 | 98.9 | 61 | 1.1 |
| 33 | $LiBF_4$ | 0.07 | 98.8 | 42 | 1.2 |
| 34 | $(NH_4)GeF_5$ | 0.10 | 99.1 | 51 | 1.2 |
| 35 | $MgSiF_6$ | 0.15 | 99.3 | 38 | 1.3 |
| Comp. Ex. 1 | None | 0 | 95.5 | 3.1 | 1.0 |

*Ratio of an experimental density to the theoretical value

EXAMPLES 36-45 AND COMPARATIVE EXAMPLES 2

Powdered scintillators of $(Gd_{0.997}Pr_{0.003}Ce_{6\times 10^{-6}})_2O_2S$ containing 90 ppm of F and various densification additives shown in Table 3 were vacuum sealed in stainless steel containers, and then the containers were subjected to hot isostatic pressing in an argon gas at 1,300° C. under 1,500 atmospheres for 1/.5 hours. Packing density, cross-sectional area ratio of columnar, microcrystals in any cross-section and relative light output of the thus obtained sintered bodies on the basis of sintered bodies containing no densification additives likewise obtained by hot isostatic pressing are shown in Table 3.

TABLE 3

| Example No. | Densification addition Formula | Amount (wt %) | Packing density (%) | Cross-sectional area ratio of columnar microcrystal | Relative light output |
|---|---|---|---|---|---|
| 36 | LiF | 0.0005 | 97.7 | 2.1 | 1.0 |
| 37 | " | 0.001 | 97.2 | 14 | 1.1 |
| 38 | " | 0.1 | 98.9 | 50 | 1.6 |
| 39 | " | 10 | 97.1 | 73 | 1.1 |
| 40 | " | 12 | 95.9 | 72 | 0.9 |
| 41 | $Li_2GeF_6$ | 0.0005 | 95.8 | 3.4 | 1.0 |
| 42 | " | 0.001 | 97.1 | 11 | 1.1 |
| 43 | " | 0.1 | 99.8 | 64 | 1.6 |
| 44 | " | 10 | 96.3 | 75 | 1.2 |
| 45 | " | 21 | 95.6 | 73 | 0.8 |
| Comp. Ex. 2 | None | — | 95.8 | 2.1 | 1.0 |

EXAMPLES 46-56

Powered scintillators of rare earth oxysulfides shown in Table 4 containing densification additives shown in Table 5 were vacuum sealed in stainless steel containers, and then the containers were subjected to hot isostatic pressing in an argon gas at 1,300° C. under 1,250 atmospheres for 2 hours.

TABLE 4

| No. | Composition of scintillators |
|---|---|
| A | $(Gd_{0.99799}Tb_{0.002}Ce_{1\times 10^{-5}})_2O_2S:100$ ppmF |
| B | $(La_{0.99799}Pr_{0.002}Ce_{1\times 10^{-5}})_2O_2S:100$ ppmF |

TABLE 4-continued

| No. | Composition of scintillators |
|---|---|
| C | $(La_{0.99799}Tb_{0.002}Ce_{1\times10^{-5}})_2O_2S$:90 ppm F |
| D | $(Gd_{0.99799}Tb_{0.002}Ce_{1\times10^{-5}})_2O_2S$:100 ppmF |
| E | $(La_{0.99799}Pr_{0.002}Ce_{1\times10^{-5}})_2O_2S$:100 ppmF |
| F | $(La_{0.99799}Tb_{0.002}Ce_{1\times10^{-5}})_2O_2S$:90 ppmF |
| G | $(Gd_{0.96}Eu_{0.03}Tb_{0.01})_2O_2S$ |
| H | $(La_{0.96}Eu_{0.03}Pr_{0.01})_2O_2S$ |
| I | $(La_{0.96}Eu_{0.03}Tb_{0.01})_2O_2S$ |
| J | $(Y_{0.96}Eu_{0.03}Pr_{0.01})_2O_2S$ |
| K | $(Y_{0.96}Eu_{0.03}Tb_{0.01})_2O_2S$ |

Packing density, cross-sectional area ratio of columnar, microcrystals in any cross-section and relative light output of the thus obtained sintered bodies, on the basis of sintered bodies containing no densitification additive likewise obtained by hot isostatic pressing are shown in Table 5.

TABLE 5

| Example No. | *No. | Densification additive Formula | Densification additive Amount (wt %) | Packing density (%) | Cross-sectional area ratio of columnar microcrystal | Relative light output |
|---|---|---|---|---|---|---|
| 46 | A | LiF | 0.1 | 98.8 | 54 | 1.2 |
| 47 | B | LiF | 0.2 | 98.5 | 45 | 1.1 |
| 48 | C | Li$_2$GeF$_6$ | 0.2 | 97.9 | 49 | 1.3 |
| 49 | D | LiF | 0.1 | 99.5 | 38 | 1.1 |
| 50 | E | LiF | 0.2 | 98.9 | 51 | 1.4 |
| 51 | F | Li$_2$GeF$_6$ | 0.1 | 97.8 | 45 | 1.3 |
| 52 | G | Li$_2$GeF$_6$ | 0.1 | 99.3 | 38 | 1.1 |
| 53 | H | NaBF$_4$ | 0.2 | 98.9 | 42 | 1.2 |
| 54 | I | NaBF$_4$ | 0.1 | 98.6 | 52 | 1.2 |
| 55 | J | NaBF$_4$ | 0.3 | 98.9 | 46 | 1.1 |
| 56 | K | NaBF$_4$ | 0.2 | 99.1 | 61 | 1.3 |

*No. shows the composition of scintillators in Table 4.

As described in detail above, the present invention provides a sintered body of rear earth oxysulfidie having a higher light output than that of the conventional sintered body of rare earth oxysulfide, and has the following effects:

(1) A scintillator of high light output for radiation defection can be obtained.

(2) The thickness of a scintillator can be made larger owing to the higher light output of the scintillator, unnecessitating the radiation-absorbing material, such so Pb glass, or making the film thinner. This can lead to cost reduction.

(3) The S/N (signal to noise) ratio can be made larger or the angular aperture of element can be made smaller, whereby the spatial resolution and density resolution can be increased over the detection limit of the conventional radiation detector.

What is claimed is:

1. A radiation detector, which comprises a light-transmitting, sintered scintillator body prepared by admixing a powdered scintillator capable of emitting light by radiation and represented by the general formula $$(Ln_{1-x-y}Pr_xCe_y)_2O_2S: (X)$$

wherein Ln is at least one element selected from the group consisting of Gd, La and Y, X is at least one element selected from the group consisting of F and Cl, x is in a range of $3\times10^{-6}\leq X\leq 0.2$, y is in a range of $10^{-6}\leq y\leq 5\times10^{-3}$, and X is in an amount of 5 to 1,000 ppm, with 0.001 to 10% by weight, on the basis of the powdered scintillator, of one member selected from the group consisting of Li$_2$GeF$_6$, (NH$_4$)$_2$GeF$_6$, Na$_2$GeF$_6$, K$_2$GeF$_6$, NaPF$_6$, KPF$_6$, NH$_4$PF$_6$, Na$_3$AlF$_6$, K$_2$SiF$_6$, Li$_2$SiF$_6$·2H$_2$O, Na$_2$SiF$_6$, LiF, NaHF$_2$, KHF$_2$, NH$_4$HF$_2$, Na$_2$TiF$_6$, K$_2$TiF$_6$, K$_2$ZrF$_6$, (NH$_4$)$_2$ZrF$_6$, MgSiF$_6$, SrSiF$_6$, Li$_2$B$_4$O$_7$, LiBF$_4$, NaBF$_4$ and KBF$_4$ as a densification additive, filling the mixture into a metal container, vacuum sealing the container, and subjecting the container to hot isostatic pressing and subsequent annealing, and a photodetector for detecting the light emitted from the scintillator.

2. A radiation detector, which comprises a light-transmitting, sintered scintillator body prepared by admixing a powdered scintillator capable of emitting light by radiation and represented by the general formula $$(Ln_{1-x-y}Pr_xCe_y)_2O_2S:(X)$$

wherein Ln is at least one element selected from the group consisting of Gd, La and Y, X is at least one element selected from the group consisting of F and Cl, x is in the range of $3\times10^{-6}\leq x\leq 0.2$, y is in the range of $10^{-6}\leq y\leq 5\times10^{-3}$, and X is in an amount of 5 to 1,000 ppm, with one member selected from the group consisting of Li$_2$GeF$_6$, (NH$_4$)$_2$GeF$_6$, K$_2$GeF$_6$, NaPF$_6$, KPF$_6$, NH$_4$PF$_6$, Na$_3$AlF$_6$, K$_2$SiF$_6$, Li$_2$SiF$_6$·2H$_2$O, Na$_2$SiF$_6$, LiF, NaHF$_2$, KHF$_2$, NH$_4$HF$_2$, NaTiF$_6$, K$_2$TiF$_6$, K$_2$ZrF$_6$, (NH$_4$)$_2$ZrF$_6$, MgSiF$_6$, SrSiF$_6$, Li$_2$B$_4$O$_7$, LiBF$_4$, NaBF$_4$ and KBF$_4$ in an effective amount to serve as densitification additive and to provide a radiation detector exhibiting a light output greater than that achieved in the absence of said densification additive filling the mixture into a metal container, vacuum sealing the container, and subjecting the container to hot isostatic pressing, and a photodetector for detecting the light emitted from the scintillator.

3. A radiation detector according to claim 2, wherein the container is subjected to annealing after the hot isostatic pressing.

4. A radiation detector according to claim 2, wherein the densification additive is in amount of 0.001 to 10% by weight on the basis of the powdered scintillator.

5. A radiation detector according to claim 4, wherein the sintered body contains columnar crystal grains in a cross-sectional area ratio of 10% or more in a cross-section of the sintered body.

6. A radiation detector according to claim 4, wherein the sintered body is a light density sintered body having a packing density of 96% or higher.

7. A radiation detector according to claim 4, wherein the densification additive is in amount of 0.01 to 4% by weight on the basis of the powdered scintillator and the hot isostatic pressing is carried out at temperatures of 1100° to 1500° C. and at pressures of 800 to 1,800 atmospheres.

8. A radiation detector according to claim 2, wherein the sintered body contains columnar crystal grains in a cross-sectional area ratio of 10% or more in a cross-section of the sintered body.

9. A radiation detector according to claim 2, wherein the sintered body is a light density sintered body having a packing density of 96% or higher.

* * * * *